(12) United States Patent
Maynard

(10) Patent No.: US 8,099,786 B2
(45) Date of Patent: Jan. 17, 2012

(54) EMBEDDED MECHANISM FOR PLATFORM VULNERABILITY ASSESSMENT

(75) Inventor: William Maynard, San Diego, CA (US)

(73) Assignee: Intel Corporation, Santa Clara, CA (US)

( * ) Notice: Subject to any disclaimer, the term of this patent is extended or adjusted under 35 U.S.C. 154(b) by 916 days.

(21) Appl. No.: 11/618,320

(22) Filed: Dec. 29, 2006

(65) Prior Publication Data

US 2008/0163373 A1 Jul. 3, 2008

(51) Int. Cl.
*G06F 11/00* (2006.01)
*G06F 12/14* (2006.01)
*G06F 12/16* (2006.01)
*G08B 23/00* (2006.01)

(52) U.S. Cl. ............................................. 726/25; 726/1

(58) Field of Classification Search ...................... 726/25
See application file for complete search history.

(56) References Cited

U.S. PATENT DOCUMENTS

| | | | |
|---|---|---|---|
| 7,058,968 B2 * | 6/2006 | Rowland et al. .................. | 726/1 |
| 7,162,649 B1 * | 1/2007 | Ide et al. ....................... | 713/165 |
| 7,178,166 B1 * | 2/2007 | Taylor et al. .................... | 726/25 |
| 7,370,324 B2 * | 5/2008 | Goud et al. ....................... | 718/1 |
| 7,761,918 B2 * | 7/2010 | Gula et al. ....................... | 726/23 |
| 2006/0136986 A1 * | 6/2006 | Doolittle ........................... | 726/1 |
| 2009/0307753 A1 * | 12/2009 | Dupont et al. .................... | 726/3 |
| 2010/0043066 A1 * | 2/2010 | Miliefsky ........................ | 726/9 |

FOREIGN PATENT DOCUMENTS

| | | |
|---|---|---|
| JP | 2006178936 | 7/2006 |
| KR | 1020020062070 A | 7/2002 |

OTHER PUBLICATIONS

Office Action, mailed Jun. 10, 2010, for CN Patent Application 200710305281.1, 10 pages.
Office Action for JP Application 2007-334338 mailed Oct. 26, 2009, 14 pages.
Ruo Ando, et al., "Improving debugging facilities on VMM for computer forensics," Computer Security Symposium 2006 (CSS2006), Information Processing Society of Japan Symposium Series, vol. 2006, No. 11, pp. 501-505, Information Processing Society of Japan, Oct. 25, 2006.
Kamizono et al., "Note on Unknown Virus Detection System Using Virtual Network," Dept. of Info. Sci. and Intell. Sys., The University of Tekushima, Oct. 2003, 7 pages.
Office Action for Chinese Patent Application 200710305281.1, mailed Jan. 26, 2011, 6 pages.
Office Action for Korean Patent Application 10-2007-0140962, mailed Mar. 31, 2009, 6 pages.

* cited by examiner

*Primary Examiner* — Kambiz Zand
*Assistant Examiner* — Dant Shaifer Harriman
(74) *Attorney, Agent, or Firm* — Schwabe, Williamson & Wyatt, P.C.

(57) ABSTRACT

Embodiments of the present invention provide an embedded mechanism for platform vulnerability assessment. In various embodiments, a management component of a managed platform may scan at least one host component of the managed platform for vulnerability of the at least one host component with respect to security policies of a management console of a network. The management component may address potential vulnerability of the at least one host component. Other embodiments may be described and claimed.

24 Claims, 3 Drawing Sheets

EMBEDDED MECHANISM FOR PLATFORM VULNERABILITY ASSESSMENT

TECHNICAL FIELD

Embodiments of the present invention relate to the field of computing security, and more particularly, to an embedded mechanism for platform vulnerability assessment.

BACKGROUND

For an increasing number of enterprises, such as, for example, financial institutions, compliance management is a key component of the overall management of platforms within the enterprise. For example, at one well known financial institution, it is estimated that 30 percent of all their network traffic is related to polling machines for compliance data. Compliance management involves many components working together to ensure that each platform is conforming to information technology (IT) policies and that these policies have not been tampered with. One of the more networking intensive elements of the compliance scanning is scanning machines for known vulnerabilities. This may be network intensive because it can involve port scanning.

BRIEF DESCRIPTION OF THE DRAWINGS

Embodiments of the present invention will be readily understood by the following detailed description in conjunction with the accompanying drawings. To facilitate this description, like reference numerals designate like structural elements. Embodiments of the invention are illustrated by way of example and not by way of limitation in the figures of the accompanying drawings.

DETAILED DESCRIPTION OF EMBODIMENTS OF THE INVENTION

In the following detailed description, reference is made to the accompanying drawings which form a part hereof wherein like numerals designate like parts throughout, and in which is shown by way of illustration embodiments in which the invention may be practiced. It is to be understood that other embodiments may be utilized and structural or logical changes may be made without departing from the scope of the present invention. Therefore, the following detailed description is not to be taken in a limiting sense, and the scope of embodiments in accordance with the present invention is defined by the appended claims and their equivalents.

Various operations may be described as multiple discrete operations in turn, in a manner that may be helpful in understanding embodiments of the present invention; however, the order of description should not be construed to imply that these operations are order dependent.

For the purposes of the present invention, the phrase "A/B" means A or B. For the purposes of the present invention, the phrase "A and/or B" means "(A), (B), or (A and B)". For the purposes of the present invention, the phrase "at least one of A, B, and C" means "(A), (B), (C), (A and B), (A and C), (B and C), or (A, B and C)". For the purposes of the present invention, the phrase "(A)B" means "(B) or (AB)" that is, A is an optional element.

The description may use the phrases "in an embodiment," or "in embodiments," which may each refer to one or more of the same or different embodiments. Furthermore, the terms "comprising," "including," "having," and the like, as used with respect to embodiments of the present invention, are synonymous.

Embodiments of the present invention provide an embedded mechanism for platform vulnerability assessment.

In accordance with various embodiments of the present invention, vulnerability scanning is performed in an execution container on a managed platform of a network. This allows the vulnerability scanning to be performed locally on the platform without using an external network or an agent running on the host operating system that may itself be subject to attack. In accordance with one embodiment, a stand alone host uses an embedded hardware management engine (ME) in the managed platform to perform the vulnerability scanning while in a second embodiment, a management partition of the managed platform performs vulnerability scanning of a virtual machine.

Figure 1:
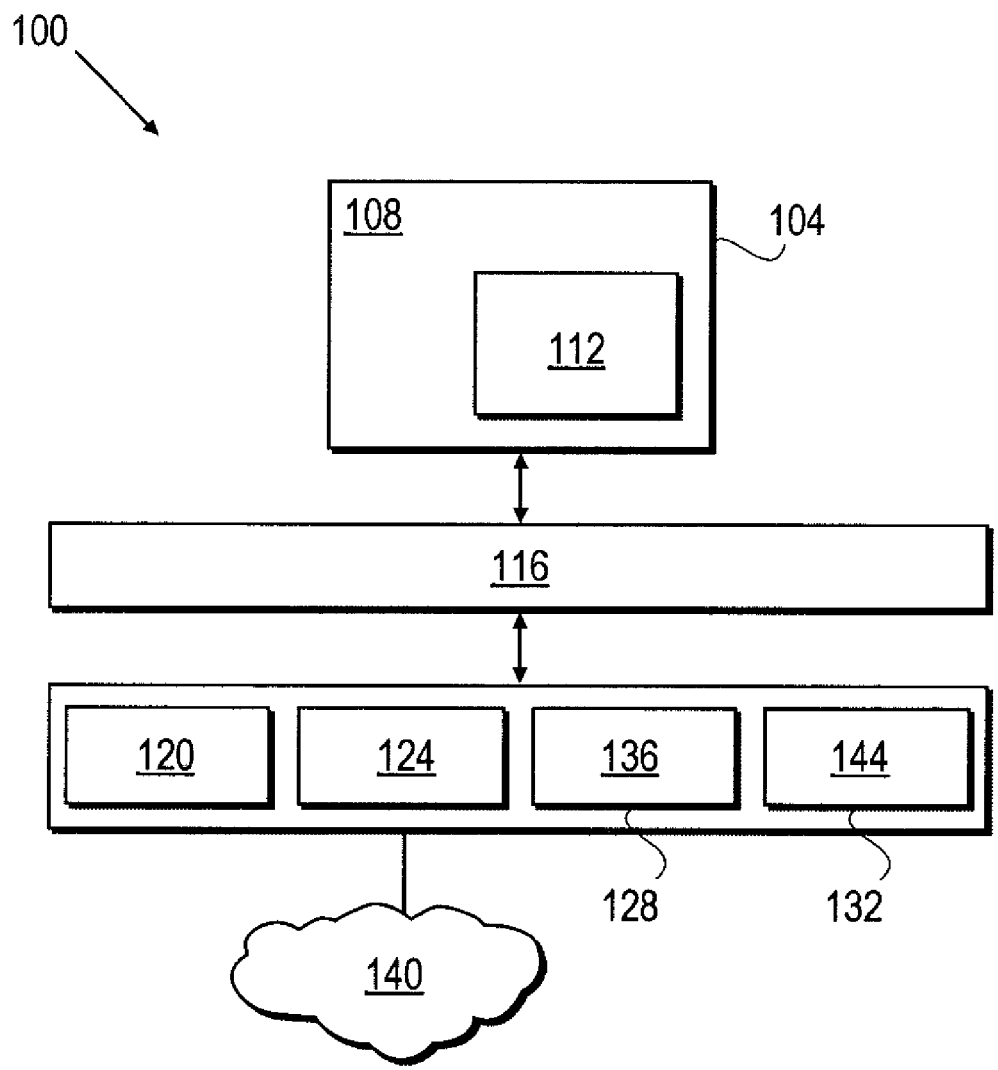
FIG. 1 schematically illustrates a computer system that may use a vulnerability scanner, in accordance with various embodiments of the present invention.

FIG. 1 schematically illustrates a computer system 100 that may include a vulnerability scanner, in accordance with various embodiments of the present invention. As will become apparent herein, at least portions of system 100 may form a managed platform, including a vulnerability scanner, within a network, in accordance with various embodiments of the present invention.

The system 100 may have an execution environment 104, which may be the domain of an executing operating system (OS) 108. The OS 108 may be a component configured to execute and control general operation of other components within the execution environment 104, such as a software component 112, subject to management by a management module 116. The management module 116 may arbitrate general component access to hardware resources such as one or more processor(s) 120, network interface controller 124, storage 128, and/or memory 132.

In some embodiments, the component 112 may be a supervisory-level component, e.g., a kernel component. In various embodiments, a kernel component may be services (e.g., loader, scheduler, memory manager, etc.), extensions/drivers (e.g., for a network card, a universal serial bus (USB) interface, a disk drive, etc.), or a service-driver hybrid (e.g., intrusion detectors to watch execution of code).

The processor(s) 120 may execute programming instructions of components of the system 100. The processor(s) 120 may be single and/or multiple-core processor(s), controller (s), application specific integrated circuit(s) (ASIC(s)), etc.

In an embodiment, storage 128 may represent non-volatile storage to store persistent content to be used for the execution of the components of the system 100, such as, but not limited to, operating system(s), program files, configuration files, etc. In an embodiment, storage 128 may include stored content 136, which may represent the persistent store of source content for the component 112. The persistent store of source content may include, e.g., executable code store that may have executable files and/or code segments, links to other routines (e.g., a call to a dynamic linked library (DLL)), a data segment, etc.

In various embodiments, storage 128 may include integrated and/or peripheral storage devices, such as, but not limited to, disks and associated drives (e.g., magnetic, optical), universal serial bus (USB) storage devices and associated ports, flash memory, ROM, non-volatile semiconductor devices, etc.

In various embodiments, storage 128 may be a storage resource physically part of the system 100 or it may be accessible by, but not necessarily, a part of the system 100. For example, the storage 128 may be accessed by the system 100 over a network 140 via the network interface controller 124. Additionally, multiple systems 100 may be operatively coupled to one another via network 140.

Upon a load request, e.g., from a loading agent of the OS 108, the management module 116 and/or the OS 108 may load the stored content 136 from storage 128 into memory 132 as active content 144 for operation of the component 112 in the execution environment 104.

In various embodiments, the memory 132 may be volatile storage to provide active content for operation of components on the system 100. In various embodiments, the memory 132 may include RAM, dynamic RAM (DRAM), static RAM (SRAM), synchronous DRAM (SDRAM), dual-data rate RAM (DDRRAM), etc.

In some embodiments the memory 132 may organize content stored therein into a number of groups of memory locations. These organizational groups, which may be fixed and/or variable sized, may facilitate virtual memory management. The groups of memory locations may be pages, segments, or a combination thereof.

As used herein, the term "component" is intended to refer to programming logic and associated data that may be employed to obtain a desired outcome. The term component may be synonymous with "module" or "agent" and may refer to programming logic that may be embodied in hardware or firmware, or in a collection of software instructions, possibly having entry and exit points, written in a programming language, such as, for example, C++, Intel Architecture 32 bit (IA-32) executable code, etc.

A software component may be compiled and linked into an executable program, or installed in a dynamic link library, or may be written in an interpretive language such as BASIC. It will be appreciated that software components may be callable from other components or from themselves, and/or may be invoked in response to detected events or interrupts. Software instructions may be provided in a machine accessible medium, which when accessed, may result in a machine performing operations or executions described in conjunction with components of embodiments of the present invention. Machine accessible medium may be firmware, e.g., an electrically erasable programmable read-only memory (EEPROM), or other recordable/non-recordable medium, e.g., read-only memory (ROM), random access memory (RAM), magnetic disk storage, optical disk storage, etc. It will be further appreciated that hardware components may be comprised of connected logic units, such as gates and flip-flops, and/or may be comprised of programmable units, such as programmable gate arrays or processors. In some embodiments, the components described herein are implemented as software modules, but nonetheless may be represented in hardware or firmware. Furthermore, although only a given number of discrete software/hardware components may be illustrated and/or described, such components may nonetheless be represented by additional components or fewer components without departing from the spirit and scope of embodiments of the invention.

In embodiments of the present invention, an article of manufacture may be employed to implement one or more methods as disclosed herein. For example, in exemplary embodiments, an article of manufacture may comprise a storage medium and a plurality of programming instructions stored in the storage medium and adapted to program an apparatus to enable the apparatus to request from a proxy server one or more location restriction(s) to modify one or more user preference(s). In various ones of these embodiments, programming instructions may be adapted to modify one or more user preferences to subject the one or more user preferences to one or more location restrictions. In various embodiments, article of manufacture may be employed to implement one or more methods as disclosed herein in one or more client devices. In various embodiments, programming instructions may be adapted to implement a browser, and in various ones of these embodiments, a browser may be adapted to allow a user to display information related to a network access. In an exemplary embodiment, programming instructions may be adapted to implement a browser on a client device.

Figure 2:
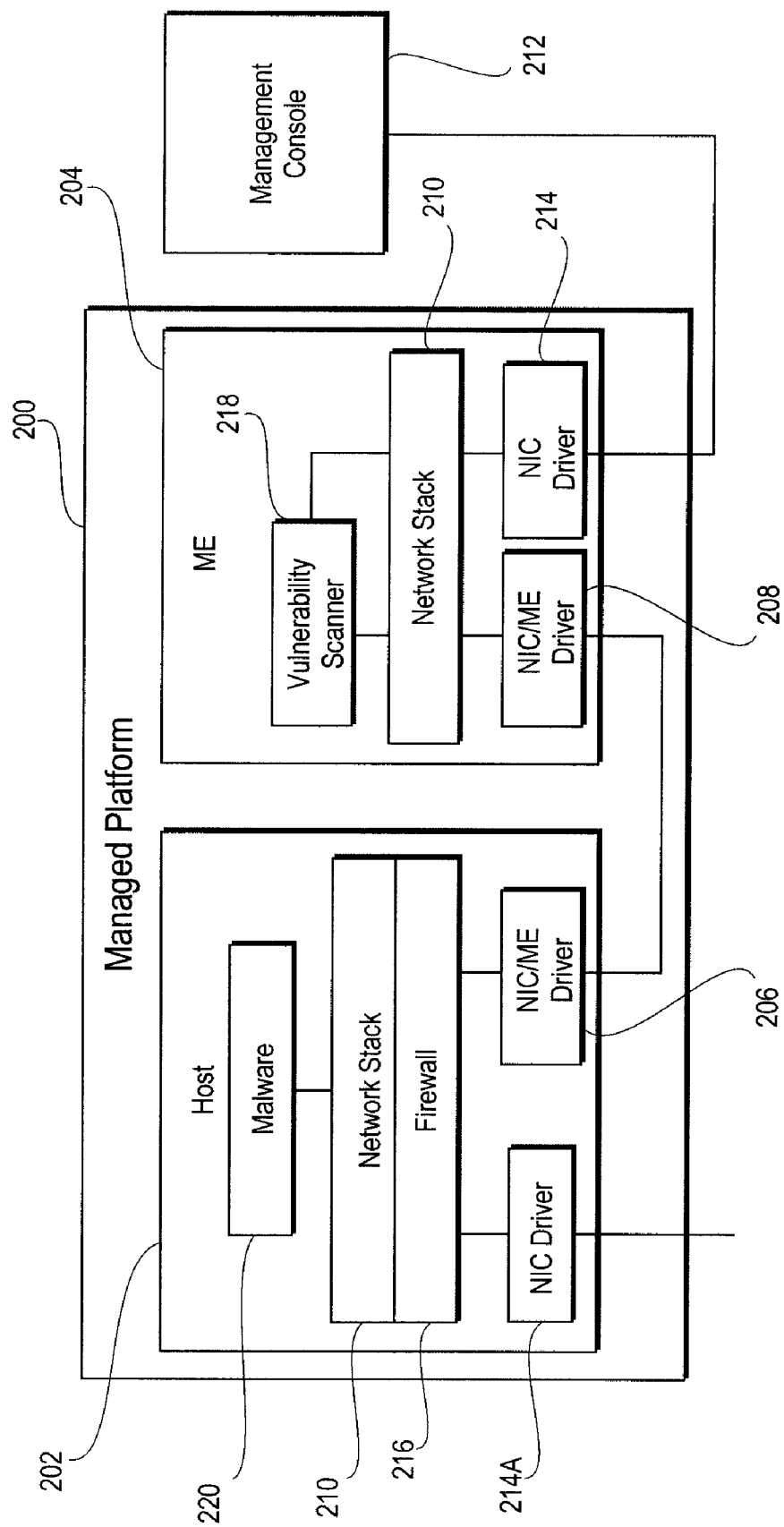
FIG. 2 schematically illustrates an exemplary managed platform, in accordance with various embodiments of the present invention.

With reference to FIG. 2, in accordance with various embodiments of the present invention, a managed platform 200 includes a host component 202 and a management component 204 that serves as a management engine. The host component provides the operating system for the managed platform. The host component may be communicatively coupled to the embedded management component via network interface card (NIC) drivers 206, 208 that looks like a normal network interface to network stack 210. A management console 212 of a network may be communicatively coupled to the management component via an NIC driver 214. The NIC driver may be dedicated or shared (214A) with the host component.

As known in the art, the host component generally includes a firewall 216, to which drivers 206, 214a are communicatively coupled via ports. In accordance with various embodiments of the present invention, the management component includes a vulnerability scanner 218. Drivers 208, 214 are communicatively coupled to network stack 210.

In accordance with the various embodiments, the NIC is an out of band (OOB) network interface. In accordance with various embodiments, the management console configures and controls the vulnerability scanner through the OOB network interface of the management component.

Vulnerability of host component 202 may arise from either lack of proper patches or firewall configuration, as well as a result of a malware attack (indicated with 220). Thus, in operation, management console 212 configures vulnerability scanner 218 with various security rules and policies for the network. Additionally, the vulnerability scanner is configured to perform scans at some periodic interval. As an example, a worm or other malware infects the host component. The worm alters the firewall rules to allow a back door for attacks to the host component and/or to let it propagate to other host components, either within the managed platform or within the network. The vulnerability scanner performs periodic vulnerability scan and detects open port(s) in the firewall. The management component, either on its own or through the vulnerability scanner, responds according to the policies and rules of the management console. This may include, for example, sending an alert to the management console and/or installing a hardware packet filter to restrict traffic to and/or from the host.

Figure 3:
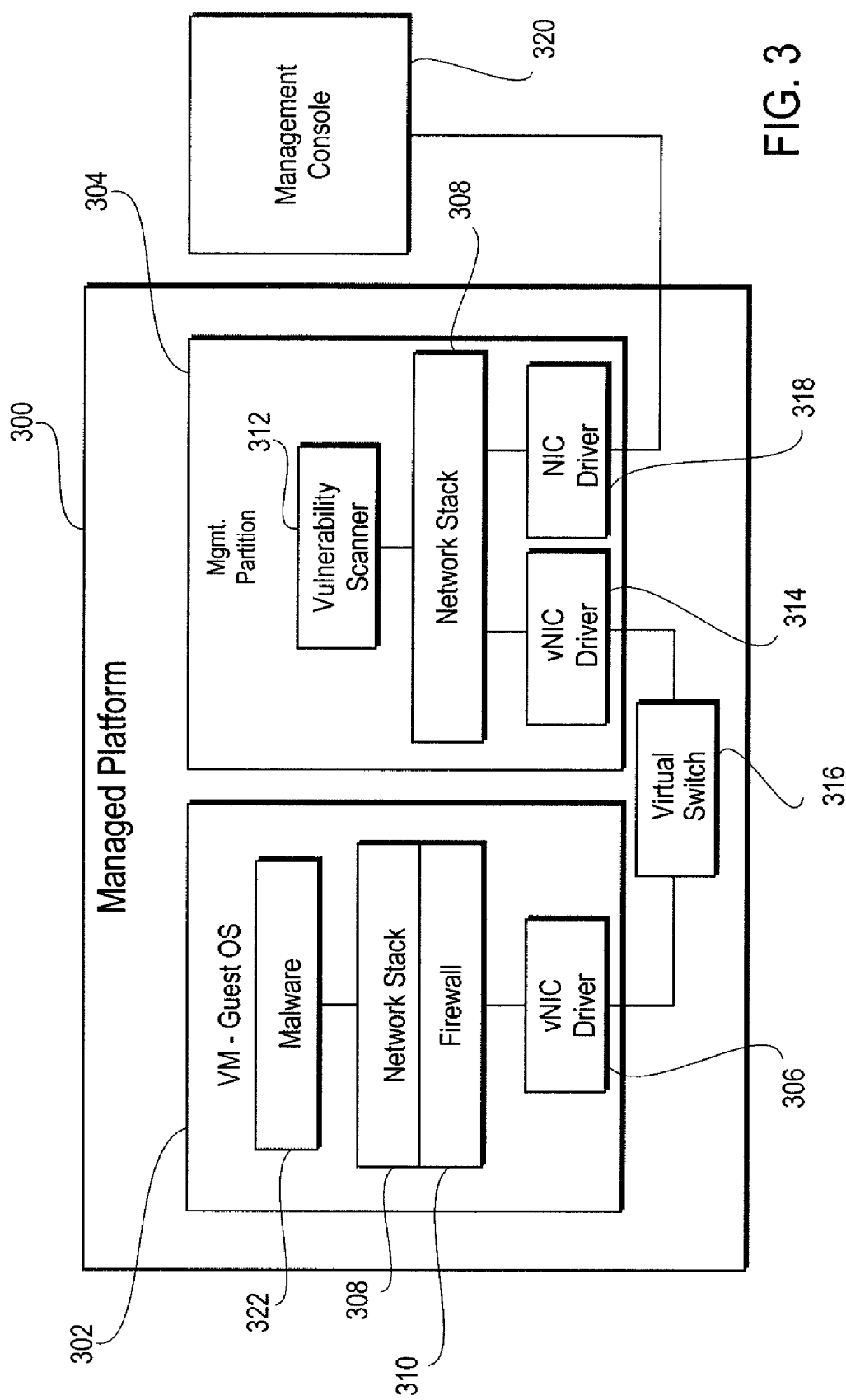
FIG. 3 schematically illustrates an exemplary managed platform, in accordance with various embodiments of the present invention.

With reference to FIG. 3, in accordance with various embodiments of the present invention, a managed platform 300 may include one or more partitions that function as one or more virtual machines (VM) 302. In accordance with various embodiments, at least one management partition 304 is included. Thus, in accordance with various embodiments, a virtual machine 302 corresponds to a host component and a management partition 304 corresponds to a management component.

In accordance with various embodiments, a virtual machine 302, serving as an operating system, includes a virtual NIC driver 306 that is communicatively coupled to the network stack 308 via a firewall 310. In accordance with various embodiments, management partition 304 includes a virtual NIC driver 314. Virtual NIC drivers 306, 314 are communicatively coupled to one another via a virtual switch 316. As known in the art, different virtual machines within the managed platform may serve as the operating system and virtual switch 316 may be used to communicatively couple virtual machines and management partitions.

In accordance with various embodiments, an NIC driver 318 is communicatively coupled to network stack 308 and a management console 320 of the network. In accordance with various embodiments of the present invention, management partition 304 includes a vulnerability scanner 312. Management partition 304 may or may not be configured to include other components for various functions as desired. The management console configures vulnerability scanner 312 with security rules and policies. The management console also configures the vulnerability scanner with target virtual machine internet protocol (IP) addresses. The vulnerability scanner is configured to perform scans of virtual machine 302 at some periodic interval. In accordance with various embodiments, the vulnerability scanner may be configured to scan other virtual machines (not shown) of managed platform 300.

When a worm or other malware 322 infects a virtual machine, the worm generally alters the firewall rules to allow a back door for attacks to the host and/or to propagate to other hosts within the managed platform and/or network. The vulnerability scanner performs periodic vulnerability scans and detects open ports within the firewall. The management partition, either on its own or through the vulnerability scanner, responds to the detected open ports according to policy. Such policy may include, for example, sending an alert to the management console, instructing the management partition to restrict traffic for the virtual machine, and/or installing a hardware packet filter to restrict traffic to and/or from the virtual machine.

In accordance with various embodiments, management partition 304 may be implemented with code in a management partition or in a Virtual Machine Manager's own control partition, (such as, for example, Domain 0 for the Xen hypervisor). A feature in the exemplary embodiment of FIG. 3 is that the virtual machine that includes the host component (guest OS) to be scanned may use the built-in virtual switch capabilities of the Virtual Machine Manager (not shown) for access to at least one network. Such a topology supports both shared NICs and private virtual Ethernet LANs.

Accordingly, vulnerability of a host component may be scanned by a management component co-located on the managed platform in a network-like manner, analogous to a network based manner a management console would scan the host component for vulnerability.

Although certain embodiments have been illustrated and described herein for purposes of description of the preferred embodiment, it will be appreciated by those of ordinary skill in the art that a wide variety of alternate and/or equivalent embodiments or implementations calculated to achieve the same purposes may be substituted for the embodiments shown and described without departing from the scope of the present invention. Those with skill in the art will readily appreciate that embodiments in accordance with the present invention may be implemented in a very wide variety of ways. This application is intended to cover any adaptations or variations of the embodiments discussed herein. Therefore, it is manifestly intended that embodiments in accordance with the present invention be limited only by the claims and the equivalents thereof.

What is claimed is:

1. A method comprising:
scanning, by a vulnerability scanner operating within a management partition of a managed device, a firewall associated with a host partition of the managed device for one or more vulnerabilities of the host partition, the host partition further having an operating system, and the scanning being performed through a first network driver of the management partition and a second network driver of the host partition, the first network driver of the management partition and the second network driver of the host partition being communicatively coupled with each other,
wherein the management partition including the vulnerability scanner and the first network driver, and the host partition including the operating system and the second network driver, reside on the managed device, and
wherein the vulnerability scanner of the management partition is configured to operate independent of the operating system of the host partition; and
addressing, by the vulnerability scanner operating within the management partition, a potential vulnerability of the host partition discovered during the scanning.

2. The method of claim 1, wherein the scanning comprises scanning, by the vulnerability scanner operating within the management partition of the managed device, for open ports associated with the firewall of the host partition of the managed device through the network interface.

3. The method of claim 1, wherein the management partition is a management engine embedded in the managed device.

4. The method of claim 1, wherein addressing the potential vulnerability of the host partition comprises at least one of sending an alert to a remotely disposed management console or installing, via the first network driver the management partition and the second network driver of the host partition, a hardware packet filter to restrict traffic to and/or from the host partition.

5. An apparatus comprising:
a host partition configured to operate an operating system, a firewall, and a first network driver; and
a management partition locally co-reside with the host partition, and configured to operate a vulnerability scanner and a second network driver, wherein the second network driver is communicatively coupled to the first network driver of the host partition, wherein the vulnerability scanner is configured to scan the firewall of the host partition, through the second network driver of the management partition and the first network driver of the host partition, for one or more vulnerabilities of the host partition, and wherein the vulnerability scanner of the management partition is configured to operate independent of the operating system of the host partition.

6. The apparatus of claim 5, wherein the vulnerability scanner is configured to scan for open ports associated with the firewall of the host partition through the second network driver of the management partition and the first network driver of the host partition.

7. The apparatus of claim 5, wherein the management partition is a management engine embedded in the apparatus.

8. The apparatus of claim 7, further comprising a network interface configured to communicatively couple the management partition to a management console remotely disposed from the apparatus.

9. The apparatus of claim 8, wherein the network interface is configured to operate as an out-of-band (OOB) network interface to allow the management console to communicate with the management partition regardless whether the host partition is operating.

10. The apparatus of claim 8, wherein the network interface is shared by the host partition and the management partition.

11. The apparatus of claim 5, wherein the management partition is configured to perform at least one of send an alert to a management console remotely disposed from the apparatus, or install, via the second network driver of the management partition and the first network driver of the host partition, a hardware packet filter to restrict traffic to and/or from the host partition.

12. An article of manufacture comprising:
a tangible non-transient storage medium; and
a set of instructions stored in the storage medium configured to enable an apparatus, in response to execution of the instructions by the apparatus, to perform operations comprising:
scanning, by a vulnerability scanner operating within a management partition of the apparatus, a firewall associated with a host partition of the apparatus for one or more vulnerabilities of the host partition, the host partition further having an operating system, and the scanning being performed through a first network driver of the management partition and a second network driver of the host partition, the first network driver of the management partition and the second network driver of the host partition being communicatively coupled with each other,
wherein the management partition including the vulnerability scanner and the first network driver, and the host partition including the operating system and the second network driver, reside in an enclosure of the apparatus,
wherein the vulnerability scanner of the management partition is configured to operate independent of the operating system of the host partition; and
addressing, by the vulnerability scanner operating within the management partition, a potential vulnerability of the host partition discovered during said scanning.

13. The article of claim 12, wherein the scanning comprises scanning, by the vulnerability scanner operating within the management partition of the apparatus, for open ports associated with the firewall of the host partition through the first network driver of the management partition and a second network driver of the host partition.

14. The article of claim 12, wherein the management partition is a management engine embedded in the apparatus.

15. The article of claim 12, wherein addressing the potential vulnerability of the host partition comprises at least one of sending an alert to a remotely disposed management console, or installing, via the first network driver the management partition and the second network driver of the host partition, a hardware packet filter to restrict traffic to and/or from the host partition.

16. A managed system comprising:
a host partition configured to operate an operating system, a firewall, and a first network driver;
dynamic random access memory (DRAM) configured to store data associated with one or more vulnerability potentials of the host partition;
a management partition locally co-reside with the host partition, operatively coupled to the DRAM, and configured to operate a vulnerability scanner and a second network driver, wherein the vulnerability scanner is configured to scan the firewall of the host partition, through the second network driver of the management partition and the first network driver of the host partition, for one or more vulnerabilities of the host partition, with respect to the one or more vulnerability potentials of the host partition,
wherein the vulnerability scanner is configured to operate independently from of the operating system of the host partition.

17. The managed system of claim 16, wherein the one or more vulnerability potentials include open ports within the firewall.

18. The managed system of claim 16, wherein the management partition includes is a management engine embedded in the managed system.

19. The managed system of claim 16, further includes a network interface configured to operate as an out-of-band (OOB) network interface to allow a management console remotely disposed from the managed system to communicate with the management partition regardless whether the host partition is operating.

20. The managed system of claim 19, wherein the network interface is shared by the management partition and the host partition.

21. The managed system of claim 16, wherein the vulnerability scanner of the management partition is further configured to perform at least one of send an alert to a remotely disposed management console or install, via the second network driver of the management partition and the first network driver of the host partition, a hardware packet filter to restrict traffic to and/or from the host partition.

22. The apparatus of claim 5, wherein the host partition is a virtual machine operating on the apparatus, and the apparatus further comprises a virtual switch communicatively coupling the first network driver of the management partition and the second network driver of the virtual machine.

23. The apparatus of claim 22, wherein the management partition is a virtual machine manager.

24. The apparatus of claim 22, wherein the management partition is another virtual machine operating on the apparatus.

* * * * *

UNITED STATES PATENT AND TRADEMARK OFFICE
CERTIFICATE OF CORRECTION

PATENT NO. : 8,099,786 B2
APPLICATION NO. : 11/618320
DATED : January 17, 2012
INVENTOR(S) : William Maynard Page 1 of 1

It is certified that error appears in the above-identified patent and that said Letters Patent is hereby corrected as shown below:

In the Claims

Column 8

Claim 16, Line 22, "independently from of..." should read -- independently of...--.

Claim 18, Line 28, "...partition includes is..." should read --...partition is...--.

Signed and Sealed this
Tenth Day of September, 2013

Teresa Stanek Rea
*Acting Director of the United States Patent and Trademark Office*